United States Patent
Takagi et al.

(10) Patent No.: US 12,365,154 B2
(45) Date of Patent: Jul. 22, 2025

(54) MIXING DEVICE, BOTTLE UNIT, AND PUNCTURE REPAIR KIT

(71) Applicant: Sumitomo Rubber Industries, Ltd., Kobe (JP)

(72) Inventors: Keiji Takagi, Kobe (JP); Takashi Maki, Kobe (JP); Kazuhiro Tatsumi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 169 days.

(21) Appl. No.: 18/122,567

(22) Filed: Mar. 16, 2023

(65) Prior Publication Data

US 2023/0321932 A1 Oct. 12, 2023

(30) Foreign Application Priority Data

Apr. 6, 2022 (JP) ................................. 2022-063545

(51) Int. Cl.
  *B29C 73/16* (2006.01)
  *B29C 73/02* (2006.01)
  *B29L 30/00* (2006.01)

(52) U.S. Cl.
  CPC .......... *B29C 73/166* (2013.01); *B29C 73/163* (2013.01); *B29L 2030/00* (2013.01)

(58) Field of Classification Search
  CPC ..... B29C 73/166; B29C 73/163; B29C 73/02; B29C 73/24; B29L 2030/00
  USPC ......................................................... 141/38
  See application file for complete search history.

(56) References Cited

U.S. PATENT DOCUMENTS

| | | | | |
|---|---|---|---|---|
| 7,178,564 B2 * | 2/2007 | Kojima | ................ | B29C 73/025 141/38 |
| 7,694,698 B2 * | 4/2010 | Marini | ................ | B29C 73/166 222/394 |
| 8,016,002 B2 * | 9/2011 | Yoshida | ................ | B29C 73/166 141/38 |
| 8,226,377 B2 * | 7/2012 | Yoshida | ................ | B29C 73/166 417/151 |
| 8,342,215 B2 * | 1/2013 | Sekiguchi | ............ | B29C 73/166 141/38 |
| 8,640,744 B2 * | 2/2014 | Dowel | ................ | F16K 17/0406 141/330 |
| 8,746,293 B2 * | 6/2014 | Chou | ................... | B29C 73/166 141/38 |
| 12,070,916 B2 * | 8/2024 | Takagi | ................... | B29C 73/24 |

(Continued)

FOREIGN PATENT DOCUMENTS

EP   2305570 B1 * 8/2016 ........... B29C 73/166
JP   2017-56662 A   3/2017

*Primary Examiner* — Kenneth Rinehart
*Assistant Examiner* — Stephanie A Shrieves
(74) *Attorney, Agent, or Firm* — Birch, Stewart, Kolasch & Birch, LLP

(57) ABSTRACT

A mixing device for mixing a puncture repair liquid and compressed air includes a mixing chamber, a first inlet for supplying the compressed air in a first flow direction to the mixing chamber, a second inlet for supplying the puncture repair liquid to the mixing chamber, and an outlet for discharging a mixture of the puncture repair liquid and the compressed air from the mixing chamber. The outlet discharges the mixture in a second flow direction at a position displaced from a virtual line extending from the first inlet in the first flow direction.

19 Claims, 5 Drawing Sheets

(56) References Cited

U.S. PATENT DOCUMENTS

| | | | |
|---|---|---|---|
| 2003/0056851 A1* | 3/2003 | Eriksen | B29C 73/166 141/105 |
| 2004/0159365 A1* | 8/2004 | Cowan | B29C 73/166 141/38 |
| 2008/0092984 A1* | 4/2008 | Marini | B29C 73/166 222/394 |
| 2008/0145245 A1* | 6/2008 | Chou | F04B 35/04 417/415 |
| 2008/0230142 A1* | 9/2008 | Hickman | B29C 73/166 141/38 |
| 2010/0186849 A1* | 7/2010 | Yoshida | B29C 73/166 141/38 |
| 2013/0199665 A1* | 8/2013 | Lolli | B29C 73/166 141/38 |
| 2022/0024163 A1* | 1/2022 | Dahlke | B29C 73/166 |

\* cited by examiner

MIXING DEVICE, BOTTLE UNIT, AND PUNCTURE REPAIR KIT

RELATED APPLICATIONS

This application claims the benefit of foreign priority to Japanese Patent Applications No. JP2022-063545, filed Apr. 6, 2022, which is incorporated by reference in its entirety.

FIELD OF THE INVENTION

The present disclosure relates to a mixing device for mixing puncture repair liquid and compressed air, a bottle unit including the mixing device, and a puncture repair kit including the bottle unit.

BACKGROUND OF THE INVENTION

Conventionally, puncture repair kits are known for repairing flat tires. For example, Japanese Unexamined Patent Application No. 2017-056662 (Patent Literature 1) has proposed a puncture repair kit for repairing a puncture by sequentially injecting a puncture repair liquid and compressed air into a punctured tire by using compressed air from a compressor.

SUMMARY OF THE INVENTION

However, since the puncture repair kit of the Patent Literature 1 injects compressed air after injecting the puncture repair liquid, a large amount of the puncture repair liquid is needed to be injected in order to seal the punctured area with the puncture repair liquid, and the time required for this process is also long.

The present disclosure was made in view of the above, and a primary object thereof is to provide a mixing device, a bottle unit, and a puncture repair kit for quick puncture repair.

The present disclosure is a mixing device for mixing a puncture repair liquid and compressed air including:
 a mixing chamber;
 a first inlet for supplying the compressed air in a first flow direction to the mixing chamber;
 a second inlet for supplying the puncture repair liquid to the mixing chamber; and
 an outlet for discharging a mixture of the puncture repair liquid and the compressed air from the mixing chamber, wherein, the outlet discharges the mixture in a second flow direction at a position displaced from a virtual line extending from the first inlet in the first flow direction.

It is possible that the mixing device of the present disclosure repairs punctures in a short period of time by having the configuration described above.

DETAILED DESCRIPTION OF THE INVENTION

Embodiments of the present disclosure will now be described below in conjunction with accompanying drawings.

Figure 1:
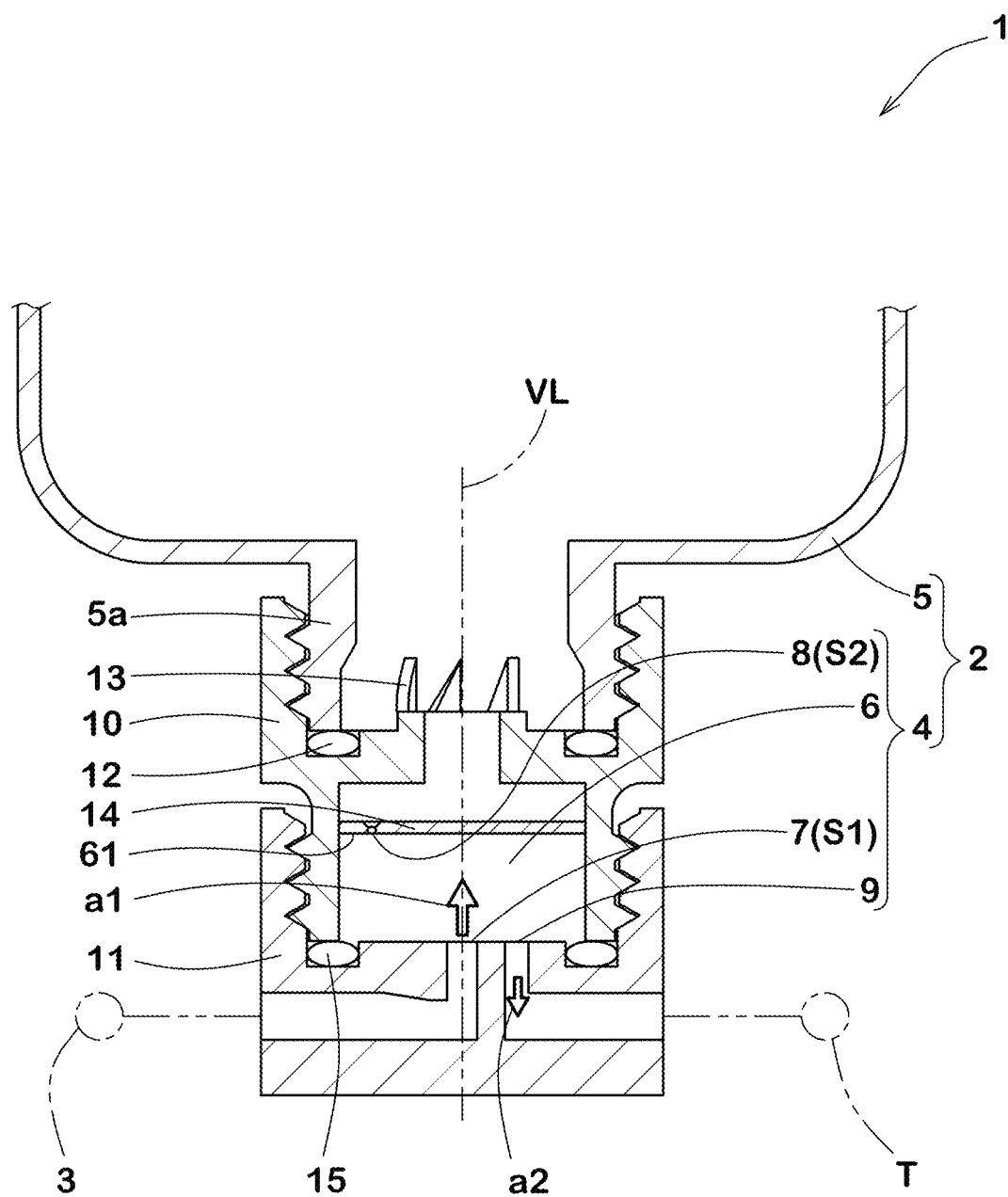
FIG. 1 is a cross-sectional view conceptually showing a puncture repair kit according to the first embodiment of the present disclosure.

FIG. 1 is a cross-sectional view conceptually showing a puncture repair kit 1 according to the first embodiment. As shown in FIG. 1, puncture repair kit 1 is suitably used to supply a puncture repair liquid and compressed air to a punctured tire (T). The puncture repair kit 1 of the present embodiment includes a bottle unit 2 and a compressor 3 for supplying compressed air.

The bottle unit 2 of the present embodiment includes a mixing device 4 and a bottle container 5 containing a puncture repair liquid. The bottle container 5 has a mouth portion (5a) for receiving the puncture repair liquid into the bottle container 5, for example. It is preferred that the mixing device 4 is attached to the mouth portion (5a). FIG. 1 shows an upright state of the bottle container 5 with the mouth portion (5a) facing downwards.

The mixing device 4 is suitably used for mixing the puncture repair liquid and the compressed air. The mixing device 4 of the present embodiment has a mixing chamber 6, a first inlet 7 for supplying the compressed air to the mixing chamber 6, a second inlet 8 for supplying the puncture repair liquid to the mixing chamber 6, an outlet 9 for discharging a mixture of the puncture repair liquid and the compressed air from the mixing chamber 6. The mixing device 4 configured as such can drip the puncture repair liquid into the mixing chamber 6 as the mixing chamber 6 is repeatedly brought into positive and negative pressure states by the pulsation of the compressed air supplied from the compressor 3.

Figure 2:
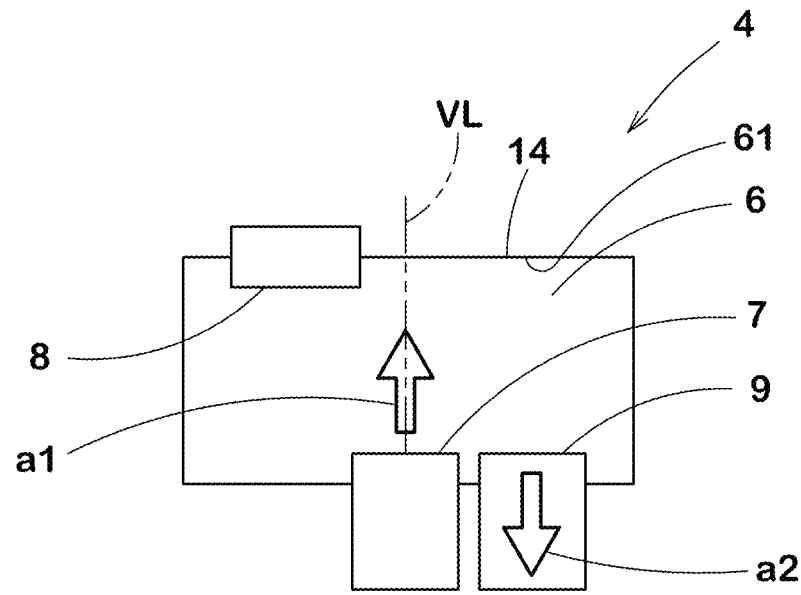
FIG. 2 is a schematic diagram of the mixing device of the first embodiment.

FIG. 2 is a schematic diagram of the mixing device 4 of the present embodiment in which the bottle container 5 is upright with the mouth portion (5a) facing downward. As shown in FIGS. 1 and 2, the first inlet 7 of the present embodiment supplies the compressed air to the mixing chamber 6 in a first flow direction (a1). The outlet 9 in the present embodiment discharges the mixture in a second flow direction (a2) at a position displaced from a virtual line (VL) extending from the first inlet 7 in the first flow direction (a1). Here, the position displaced from the virtual line extending in the first flow direction (a1) means a position that does not overlap with a virtual line extending in the first flow direction (a1) from the center of the first inlet 7.

It is possible that the mixing device 4 configured as such efficiently mixes the puncture repair liquid and the compressed air as the puncture repair liquid dripped from the second inlet 8 is stirred in the mixing chamber 6 by the compressed air supplied in the first flow direction (a1). Further, the mixing device 4 in the present embodiment can suppress the flow of agglomerates (aggregates) generated in the mixing chamber 6 into the outlet 9, and thus can suppress narrowing of the flow path caused by the agglomerates accumulating between the bottle unit 2 and the tire T. Therefore, the puncture repair kit 1 including the mixing device 4 can efficiently supply the puncture repair liquid and the compressed air at the same time, and can repair the puncture in a short time.

In a more preferred form, the mixture is an aerosol of the puncture repair liquid and the compressed air. The puncture repair kit 1 configured as such can efficiently repair punctured areas with a small amount of the puncture repair liquid, and can reduce the effect on sound-absorbing materials, sensors, and the like, even if the tire (T) has the sound-absorbing materials, sensors, and the like inside the tire (T).

It is preferred that the puncture repair liquid contains at least glycol. Examples of glycols include ethylene glycol, 1,3-propanediol, propylene glycol, and the like, for example. The puncture repair liquid configured as such is suitable for efficiently repairing puncture areas, even when a small amount of the puncture repair liquid is injected as an aerosol into the punctured tire (T).

As shown in FIG. 1, the mixing device 4 includes a first member 10 configured to be attached to the mouth portion (5a) of the bottle container 5 and a second member 11 configured to be attached to the first member 10, for example. It is preferred that the first member 10 is screwed onto the mouth portion (5a). The space between the first member 10 and the mouth portion (5a) is sealed by a first sealing member 12, for example. The first member 10 configured as such can be easily attached to the bottle container 5 and has excellent airtightness after attachment. It should be noted that the attachment of the first member 10 to the bottle container 5 is not limited to such a manner, and may employ an elastic body to prevent loosening, for example.

It is preferred that the first member 10 has a breaking portion 13 for breaking a film (not shown) for sealing the mouth portion (5a) of the bottle container 5 in a mint condition. The mixing device 4 configured as such can break the sealing of the bottle container 5 when the mixing device 4 is attached to the bottle container 5. Further, since the bottle container 5 is sealed with the film, the puncture repair liquid can be stored for a long period of time without deterioration.

The first member 10 of the present embodiment has a wall portion 14 provided with the second inlet 8. The wall portion 14 is formed as a thin plate and forms an upper surface 61 of the mixing chamber 6, for example. The second inlet 8 is at least one through hole provided in the wall portion 14, for example. The wall portion 14 is not limited to such a form, and various forms can be adopted as long as the second inlet 8 is provided. The position of the wall portion 14 may be changeable, for example, depending on the conditions of use and the like. The first member 10 configured as such can change the size of the mixing chamber 6 by changing the position of the wall portion 14, which makes it easy to change the design.

It is preferred that the second member 11 is screwed to the first member 10. The space between the first member 10 and the second member 11 is sealed by a second sealing member 15, for example. The mixing chamber 6 consists of a combination of the first member 10 and the second member 11. Therefore, it is preferred that the first member 10 and the second member 11 are assembled in advance before the first member 10 is attached to the bottle container 5. It should be noted that the attachment of the first member 10 and the second member 11 is not limited to such a mode, and a retaining structure and the like by using an elastic body may be adopted, and the first member 10 and the second member 11 may be press-fitted, bonded, or welded together in such a way that they cannot be disassembled, for example.

The second member 11 of the present embodiment is provided with the first inlet 7 and the outlet 9. In the mixing device 4 of the present embodiment, the first inlet 7 and the outlet 9 are provided in a lower part of the mixing device 4, and the second inlet 8 is provided in an upper part of the mixing device 4 when the bottle container 5 is in the upright state with the mouth portion (5a) facing downward. The first inlet 7 is located in the center of the mixing chamber 6 in a plan view, for example. It is preferred that the second inlet 8 and the outlet 9 are located on both sides of the first inlet 7 in the plan view. The mixing device 4 configured as such serves for efficient mixing of the puncture repair liquid and the compressed air.

The first inlet 7 communicates with the mixing chamber 6 by a first opening area S1, for example. The second inlet 8 communicates with the mixing chamber 6 with a second opening area S2, for example. It is preferred that the first opening area S1 is from 1.5 to 15.5 times the second opening area S2. By setting the first opening area S1 to be from 1.5 to 15.5 times the second opening area S2, the ratio of the puncture repair liquid and the compressed air can be maintained within an appropriate range.

From this point of view, the first opening area S1 is more preferably from 1.5 to 13.0 times the second opening area S2, and even more preferably from 1.5 to 10.0 times the second opening area S2. It is possible that the mixing device 4 configured as such keeps the ratio of the puncture repair liquid and the compressed air in a more appropriate range.

Figure 7:
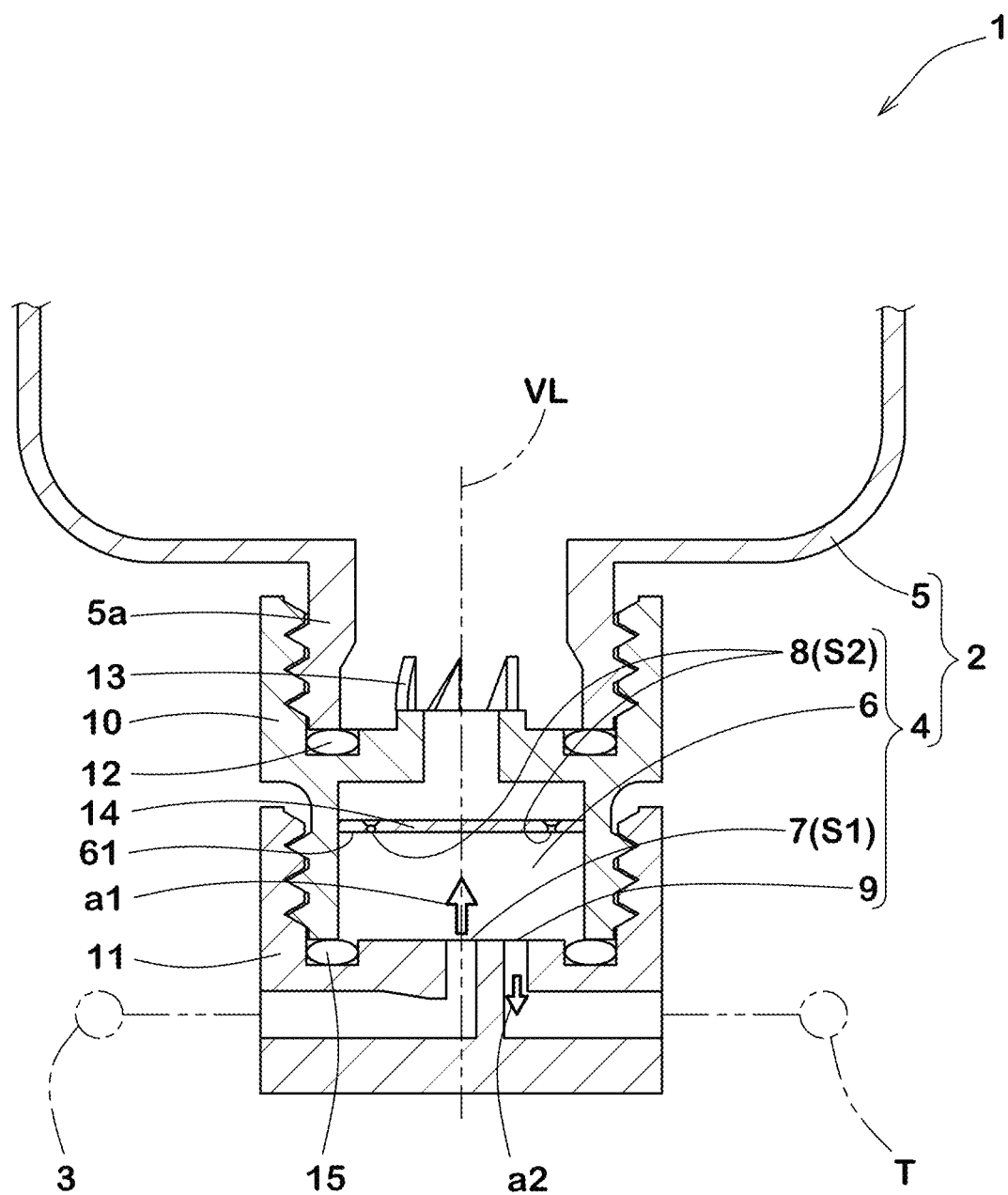
FIG. 7 is a schematic diagram of the mixing device of the sixth embodiment.

It should be noted that the second inlet 8 may be multiple through holes provided in the wall portion 14, for example. In the present embodiment, when the second inlet 8 is a plurality of holes, the second opening area S2 is the sum of the opening areas of the holes, as shown in FIG. 7.

The shape of the hole(s) of the second inlet 8 is not particularly limited, and can be appropriately selected from circular, elliptical, polygonal, and the like, for example. When the second inlet 8 is a plurality of holes, the shapes of the holes of the second inlet 8 may be all the same, or may be different for each hole, for example.

The first flow direction (a1) and the second flow direction (a2) in the present embodiment are parallel and opposite to each other. The mixing device 4 configured as such allows the compressed air to diffuse throughout the mixing chamber 6 and allows the puncture repair liquid and the compressed air to be uniformly mixed.

Figure 3:
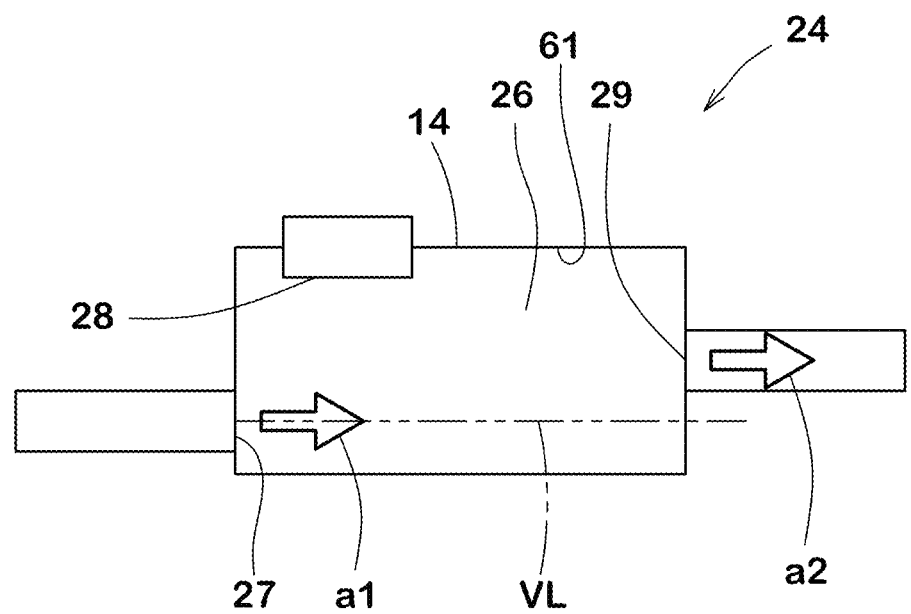
FIG. 3 is a schematic diagram of the mixing device of the second embodiment.

FIG. 3 is a schematic view of a mixing device 24 of the second embodiment in the upright state of the bottle container 5 with the mouth portion (5a) facing downwards. As shown in FIG. 3, the mixing device 24 of the second embodiment has a mixing chamber 26, a first inlet 27, a second inlet 28, and an outlet 29. The functions and the like of the mixing chamber 26, the first inlet 27, the second inlet 28, and the outlet 29 are the same as those of the mixing chamber 6, the first inlet 7, the second inlet 8, and the outlet 9 described above, and the descriptions thereof are omitted.

In the mixing device 24 of the second embodiment, the first flow direction (a1) and the second flow direction (a2) are parallel to each other and have the same orientation. It is possible that the mixing device 24 configured as such smoothly discharges the compressed air while diffusing it in the mixing chamber 26, which is helpful for quick puncture repair.

It is preferred that the outlet 29 is positioned above the first inlet 27 in the upright state of the bottle container 5 (shown in FIG. 1) in which the mouth portion (5a) faces downwards. The first inlet 27 and the outlet 29 of the second embodiment are provided in opposite side surfaces of the mixing chamber 26. The mixing device 24 configured as such can allow the agglomerates in the puncture repair liquid to deposit in a lower part of the mixing chamber 26, and can more reliably suppress the flow of the agglomerates into the outlet 29.

The first inlet 27 and the outlet 29 may partially overlap in the vertical direction, for example. Even in this case, the outlet 29 is arranged at a position that does not overlap with the virtual line extending in the first flow direction (a1) from the center of the first inlet 27. In the mixing device 24 configured as such, the height in the vertical direction of the mixing chamber 26 can be reduced, which is helpful for miniaturization.

Figure 4:
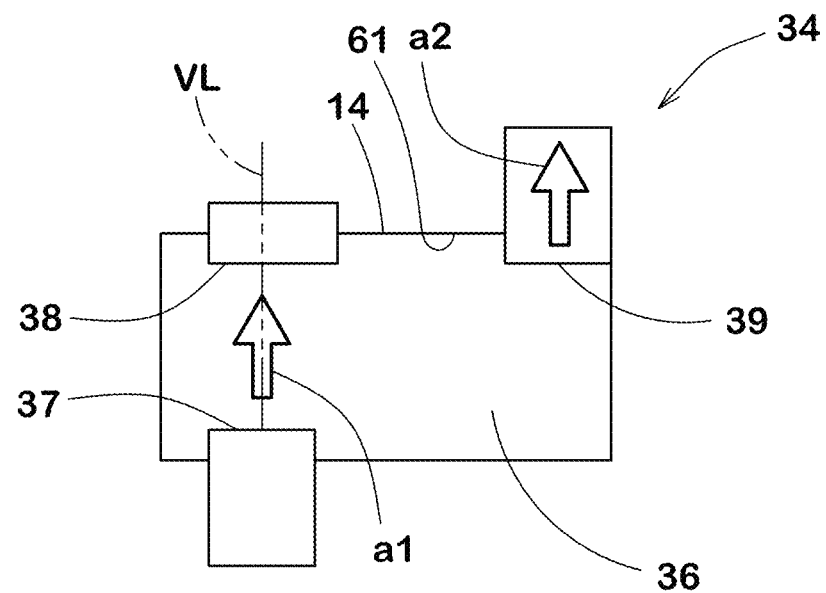
FIG. 4 is a schematic diagram of the mixing device of the third embodiment.

FIG. 4 is a schematic diagram of a mixing device 34 of the third embodiment in the upright state of the bottle container 5 with the mouth portion (5a) facing downward. As shown in FIG. 4, the mixing device 24 of the third embodiment has a mixing chamber 36, a first inlet 37, a second inlet 38, and an outlet 39. The functions and the like of the mixing chamber 36, the first inlet 37, the second inlet 38, and the outlet 39 are the same as those of the mixing chamber 6, the first inlet 7, the second inlet 8, and the outlet 9 described above, therefore, the descriptions thereof are omitted.

In the mixing device 34 of the third embodiment, the first flow direction (a1) and the second flow direction (a2) are parallel and oriented in the same direction like the mixing device 24 of the second embodiment. It is possible that the mixing device 34 configured as such smoothly discharges the mixture while the compressed air diffusing the puncture repair liquid in the mixing chamber 36, which is helpful for quick puncture repair.

It is preferred that the outlet 39 is positioned above the first inlet 37 in the upright state of the bottle container 5 (shown in FIG. 1) with the mouth portion (5a) facing downwards. The outlet 39 of the third embodiment is arranged in the upper surface 61 of the mixing chamber 36. In other words, the mixing device 34 has the wall portion 14 forming the upper surface 61 of the mixing chamber 36 in an upright state of the bottle container 5 with the mouth portion (5a) facing downwards, and the second inlet 38 is provided in the wall portion 14 with the outlet 39 provided in the wall portion 14. The mixing device 34 configured as such can allow the agglomerates generated in the mixing chamber 36 to deposit in a lower part of the mixing chamber 36, and thus can more reliably suppress the flow of the agglomerates into the outlet 29.

Figure 5:
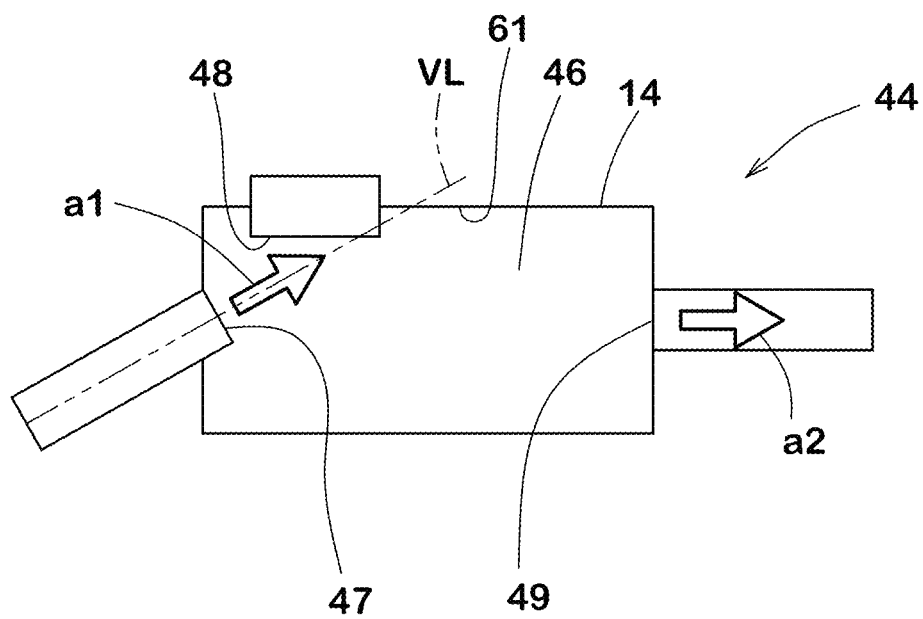
FIG. 5 is a schematic diagram of the mixing device of the fourth embodiment.

FIG. 5 is a schematic diagram of a mixing device 44 of the fourth embodiment in the upright state of the bottle container 5 with the mouth portion (5a) facing downwards. As shown in FIG. 5, the mixing device 44 of the fourth embodiment has a mixing chamber 46, a first inlet 47, a second inlet 48, and an outlet 49. The functions and the like of the mixing chamber 46, the first inlet 47, the second inlet 48, and the outlet 49 are the same as those of the mixing chamber 6, the first inlet 7, the second inlet 8, and the outlet 9 described above, and thus the descriptions thereof are omitted.

In the mixing device 44 of the fourth embodiment, the first flow direction (a1) and the second flow direction (a2) are oriented to cross each other. The mixing device 44 configured as such can supply the compressed air to circulate within the mixing chamber 46, which helps to efficiently mix the puncture repair liquid and the compressed air.

The outlet 49 of the fourth embodiment is positioned at approximately the same height as the first inlet 47 in the upright state of the bottle container 5 (shown in FIG. 1) with the mouth portion (5a) facing downwards. It is preferred that the mixing chamber 46 of the mixing device 44 before use has an empty space below the first inlet 47 and the outlet 49. The mixing device 44 configured as such can allow the aggregates generated in the mixing chamber 46 to deposit in the lower part of the mixing chamber 46 and thus can suppress the aggregates from flowing into the outlet 49.

Figure 6:
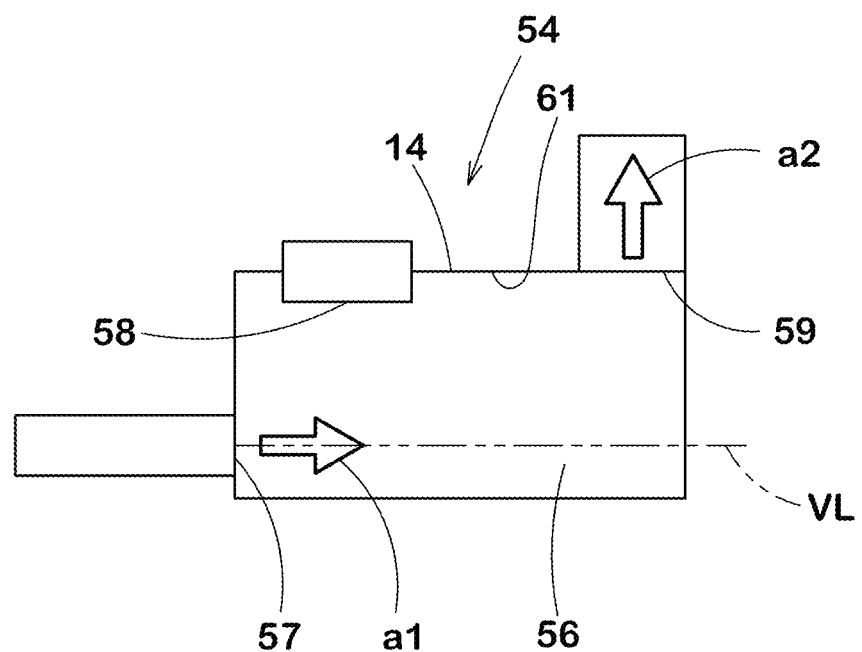
FIG. 6 is a schematic diagram of the mixing device of the fifth embodiment.

FIG. 6 is a schematic diagram of a mixing device 54 of the fifth embodiment in the upright state of the bottle container 5 with the mouth portion (5a) facing downwards. As shown in FIG. 6, the mixing device 54 of the fifth embodiment has a mixing chamber 56, a first inlet 57, a second inlet 58, and an outlet 59. The functions and the like of the mixing chamber 56, the first inlet 57, the second inlet 58, and the outlet 59 are the same as those of the mixing chamber 6, the first inlet 7, the second inlet 8, and the outlet 9 described above, and thus the descriptions thereof are omitted.

In the mixing device 54 of the fifth embodiment, the first flow direction (a1) and the second flow direction (a2) are oriented to cross each other similar to the mixing device 44 of the fourth embodiment. In the mixing device 54 of the fifth embodiment, the first flow direction (a1) and the second flow direction (a2) are orthogonal. The mixing device 54 configured as such can supply the compressed air to circulate within the mixing chamber 56, which helps to efficiently mix the puncture repair liquid and the compressed air.

The outlet 59 of the fifth embodiment is formed in the upper surface 61 of the mixing chamber 56 in the upright state of the bottle container 5 (shown in FIG. 1) with the mouth portion (5a) facing downwards. In other words, the mixing device 54 has the wall portion 14 forming the upper surface 61 of the mixing chamber 56 in an upright state of the bottle container 5 with the mouth portion (5a) facing downwards, and the second inlet 58 is provided in the wall portion 14 with the outlet 59 provided in the wall portion 14. The mixing device 54 configured as such can allow the aggregates generated in the mixing chamber 56 to deposit in the lower part of the mixing chamber 56 and thus can suppress the aggregates from flowing into the outlet 59.

While detailed description has been made of especially preferred embodiments of the present disclosure, the present disclosure can be embodied in various forms without being limited to the illustrated embodiments.

Statement of Disclosure

The present disclosure includes the following aspects.
[Present Disclosure 1]
A mixing device for mixing a puncture repair liquid and compressed air including:
    a mixing chamber;
    a first inlet for supplying the compressed air in a first flow direction to the mixing chamber;
    a second inlet for supplying the puncture repair liquid to the mixing chamber; and
    an outlet for discharging a mixture of the puncture repair liquid and the compressed air from the mixing chamber, wherein, the outlet discharges the mixture in a second flow direction at a position displaced from a virtual line extending from the first inlet in the first flow direction.
[Present Disclosure 2]
The mixing device according to Present Disclosure 1, wherein the first flow direction and the second flow direction are parallel and opposite to each other.

[Present Disclosure 3]

The mixing device according to Present Disclosure 1, wherein the first flow direction and the second flow direction are parallel to each other and have the same orientation.

[Present Disclosure 4]

The mixing device according to Present Disclosure 1, wherein the first flow direction and the second flow direction are oriented to cross each other.

[Present Disclosure 5]

The mixing device according to any one of Present Disclosures 1 to 4, wherein the mixture is an aerosol of the puncture repair liquid and the compressed air.

[Present Disclosure 6]

The mixing device according to any one of Present Disclosures 1 to 4, wherein the puncture repair liquid contains at least glycol.

[Present Disclosure 7]

The mixing device according to any one of Present Disclosures 1 to 4, wherein
the first inlet communicates with the mixing chamber by a first opening area,
the second inlet communicates with the mixing chamber by a second opening area, and
the first opening area is from 1.5 to 15.5 times the second opening area.

[Present Disclosure 8]

A bottle unit including the mixing device according to any one of Present Disclosures 1 to 4 and a bottle container, wherein
the bottle container contains the puncture repair liquid and has a mouth portion for receiving the puncture repair liquid, and
the mixing device is attached to the mouth portion.

[Present Disclosure 9]

The bottle unit according to Present Disclosure 8, wherein the outlet is positioned above the first inlet in an upright state of the bottle container with the mouth portion facing downwards.

[Present Disclosure 10]

A puncture repair kit including the bottle unit according to Present Disclosure 8 and a compressor for supplying the compressed air.

DESCRIPTION OF REFERENCE SIGNS 4, 24, 34, 44, 54 mixing device
6, 26, 36, 46, 56 mixing chamber
7, 27, 37, 47, 57 first inlet
8, 28, 38, 48, 58 second inlet
9, 29, 39, 49, 59 outlet

The invention claimed is:

1. A bottle unit comprising:
a mixing device for mixing a puncture repair liquid;
a bottle container; and
compressed air,
wherein the mixing device comprises:
a mixing chamber;
a first inlet for supplying the compressed air in a first flow direction to the mixing chamber;
a second inlet for supplying the puncture repair liquid to the mixing chamber; and
an outlet for discharging a mixture of the puncture repair liquid and the compressed air from the mixing chamber,
the outlet discharges the mixture in a second flow direction at a position displaced from a virtual line extending from the first inlet in the first flow direction,
the bottle container contains the puncture repair liquid and has a mouth portion for receiving the puncture repair liquid,
the mixing device has a first member, a second member, a first sealing member, and a second sealing member,
the first member is screwed to the mouth portion so that the mixing device is attached to the mouth portion,
the second member is screwed to the first member on a side opposite to the mouth portion,
the first sealing member is arranged between the first member and the mouth portion so as to seal therebetween,
the second sealing member is arranged between the first member and the second member so as to seal therebetween, and
the second inlet is provided in the first member.

2. The bottle unit according to claim 1, wherein the first flow direction and the second flow direction are parallel and opposite to each other.

3. The bottle unit according to claim 1, wherein the first flow direction and the second flow direction are parallel to each other and have the same orientation.

4. The bottle unit according to claim 1, wherein the first flow direction and the second flow direction are oriented to cross each other.

5. The bottle unit according to claim 4, wherein the first flow direction and the second flow direction are orthogonal.

6. The bottle unit according to claim 1, wherein the mixture is an aerosol of the puncture repair liquid and the compressed air.

7. The bottle unit according to claim 1, wherein the puncture repair liquid contains at least glycol.

8. The bottle unit according to claim 1, wherein the first inlet communicates with the mixing chamber by a first opening area,
the second inlet communicates with the mixing chamber by a second opening area, and
the first opening area is from 1.5 to 15.5 times the second opening area.

9. The bottle unit according to claim 1, wherein the outlet is positioned above the first inlet in an upright state of the bottle container with the mouth portion facing downwards.

10. A puncture repair kit comprising the bottle unit according to claim 1 and a compressor for supplying the compressed air.

11. The bottle unit according to claim 1, wherein the second inlet is formed by a plurality of holes.

12. The bottle unit according to claim 1, wherein the mixing device has a wall portion forming an upper surface of the mixing chamber in an upright state of the bottle container with the mouth portion facing downwards, and
the second inlet is provided in the wall portion.

13. The bottle unit according to claim 12, wherein the wall portion is configured to be movable so as to change capacity of the mixing chamber.

14. The bottle unit according to claim 12, wherein the outlet is provided in the wall portion.

15. The bottle unit according to claim 12, wherein the first inlet and the outlet are provided in opposite side surfaces of the mixing chamber.

16. The bottle unit according to claim 15, wherein the first inlet and the outlet are provided at positions so as to partially overlap with each other in a vertical direction.

17. The bottle unit according to claim 15, wherein the mixing chamber of the mixing device before use has an empty space below the first inlet and the outlet.

18. The bottle unit according to claim 1, wherein the bottle container has a film for sealing the mouth portion before the mixing device is attached to the mouth portion, and in an upright state of the bottle container with the mouth portion facing downwards, the mixing device has a breaking portion protruding upwards so as to break the film when the mixing device is attached to the mouth portion.

19. A bottle unit comprising:

a mixing device for mixing a puncture repair liquid;
a bottle container; and
compressed air,
wherein the mixing device comprises:
   a mixing chamber;
   a first inlet for supplying the compressed air in a first flow direction to the mixing chamber;
   a second inlet for supplying the puncture repair liquid to the mixing chamber; and
   an outlet for discharging a mixture of the puncture repair liquid and the compressed air from the mixing chamber, the outlet discharges the mixture in a second flow direction at a position displaced from a virtual line extending from the first inlet in the first flow direction, the bottle container contains the puncture repair liquid and has a mouth portion for receiving the puncture repair liquid, the mixing device is attached to the mouth portion and has a wall portion forming an upper surface of the mixing chamber in an upright state of the bottle container with the mouth portion facing downwards, the second inlet is provided in the wall portion, and the wall portion is configured to be movable so as to change capacity of the mixing chamber.

* * * * *